(12) United States Patent
McNeight

(10) Patent No.: US 9,805,364 B2
(45) Date of Patent: Oct. 31, 2017

(54) ID AUTHENTICATION

(71) Applicant: TECHNOLOGY BUSINESS MANAGEMENT LIMITED, Wilmslow, Cheshire (GB)

(72) Inventor: David L. McNeight, Wilmslow (GB)

(73) Assignee: Technology Business Management Limited, Manchester (GB)

( * ) Notice: Subject to any disclaimer, the term of this patent is extended or adjusted under 35 U.S.C. 154(b) by 838 days.

(21) Appl. No.: 14/351,248

(22) PCT Filed: Oct. 11, 2012

(86) PCT No.: PCT/GB2012/000774
§ 371 (c)(1),
(2) Date: Apr. 11, 2014

(87) PCT Pub. No.: WO2013/054072
PCT Pub. Date: Apr. 18, 2013

(65) Prior Publication Data
US 2014/0330727 A1    Nov. 6, 2014

(30) Foreign Application Priority Data

Oct. 12, 2011 (GB) .................................. 1117637.7

(51) Int. Cl.
*G06Q 20/36* (2012.01)
*G06F 21/35* (2013.01)
(Continued)

(52) U.S. Cl.
CPC ......... *G06Q 20/3674* (2013.01); *G06F 21/35* (2013.01); *G06Q 20/3278* (2013.01); *G06Q 20/352* (2013.01); *G06Q 20/353* (2013.01); *G06Q 20/385* (2013.01); *G06Q 20/3821* (2013.01); *G06Q 20/401* (2013.01);
(Continued)

(58) Field of Classification Search
USPC ................ 235/380; 705/16, 67, 75; 455/558
See application file for complete search history.

(56) References Cited

U.S. PATENT DOCUMENTS 6,539,101 B1    3/2003  Black
8,806,616 B2    8/2014  Buer et al.
(Continued)

FOREIGN PATENT DOCUMENTS

EP    2071486    6/2009
GB    2317983    4/1998
(Continued)

OTHER PUBLICATIONS

International Search Report for PCT/GB2012/000774, dated Feb. 21, 2013.
(Continued)

*Primary Examiner* — Allyson Trail
(74) *Attorney, Agent, or Firm* — Dority & Manning, P.A.

(57) ABSTRACT

A method for ID authentication, in which equipment involved in a transaction requests a password from a physically separate but limited-range communicating device, which automatically supplies a password in response to such request and communicates it to the equipment, the password is assessed as valid or invalid and the transaction approved or not accordingly.

17 Claims, 2 Drawing Sheets

(51) Int. Cl.
  *G06Q 20/32* (2012.01)
  *G06Q 20/34* (2012.01)
  *G06Q 20/38* (2012.01)
  *G06Q 20/40* (2012.01)

(52) U.S. Cl.
  CPC ..... *G06Q 20/4014* (2013.01); *G06Q 20/4097* (2013.01); *G06Q 2220/00* (2013.01)

(56) References Cited

U.S. PATENT DOCUMENTS

| | | | |
|---|---|---|---|
| 8,935,762 B2 | 1/2015 | Moas et al. | |
| 2005/0187882 A1 | 8/2005 | Savio et al. | |
| 2006/0016881 A1 | 1/2006 | Roux | |
| 2006/0169771 A1 | 8/2006 | Brookner | |
| 2007/0022058 A1* | 1/2007 | Labrou | G06Q 20/32 705/67 |
| 2009/0006846 A1 | 1/2009 | Rosenblatt | |
| 2009/0143104 A1* | 6/2009 | Loh | G06Q 20/32 455/558 |
| 2010/0274677 A1* | 10/2010 | Florek | G06Q 20/10 705/16 |
| 2010/0327054 A1 | 12/2010 | Hammad | |
| 2011/0225094 A1* | 9/2011 | Hammad | G06Q 20/40 705/75 |
| 2012/0246079 A1* | 9/2012 | Wilson | H04L 63/0807 705/67 |
| 2012/0290376 A1* | 11/2012 | Dryer | G06Q 20/3278 705/14.23 |
| 2012/0290472 A1* | 11/2012 | Mullen | G06Q 10/00 705/39 |
| 2016/0005032 A1* | 1/2016 | Yau | G06Q 20/3678 705/69 |
| 2016/0189154 A1* | 6/2016 | Eramian | G06Q 20/405 705/44 |

FOREIGN PATENT DOCUMENTS

| | | |
|---|---|---|
| GB | 2476989 | 7/2011 |
| JP | 2006190175 | 7/2006 |
| WO | WO 95/25391 | 9/1995 |
| WO | WO 2009/001020 | 12/2008 |
| WO | WO 2010/043974 | 4/2010 |

OTHER PUBLICATIONS

International Search Report for PCT/GB2012/000774, dated Feb. 21, 2013, 8 pages.

* cited by examiner

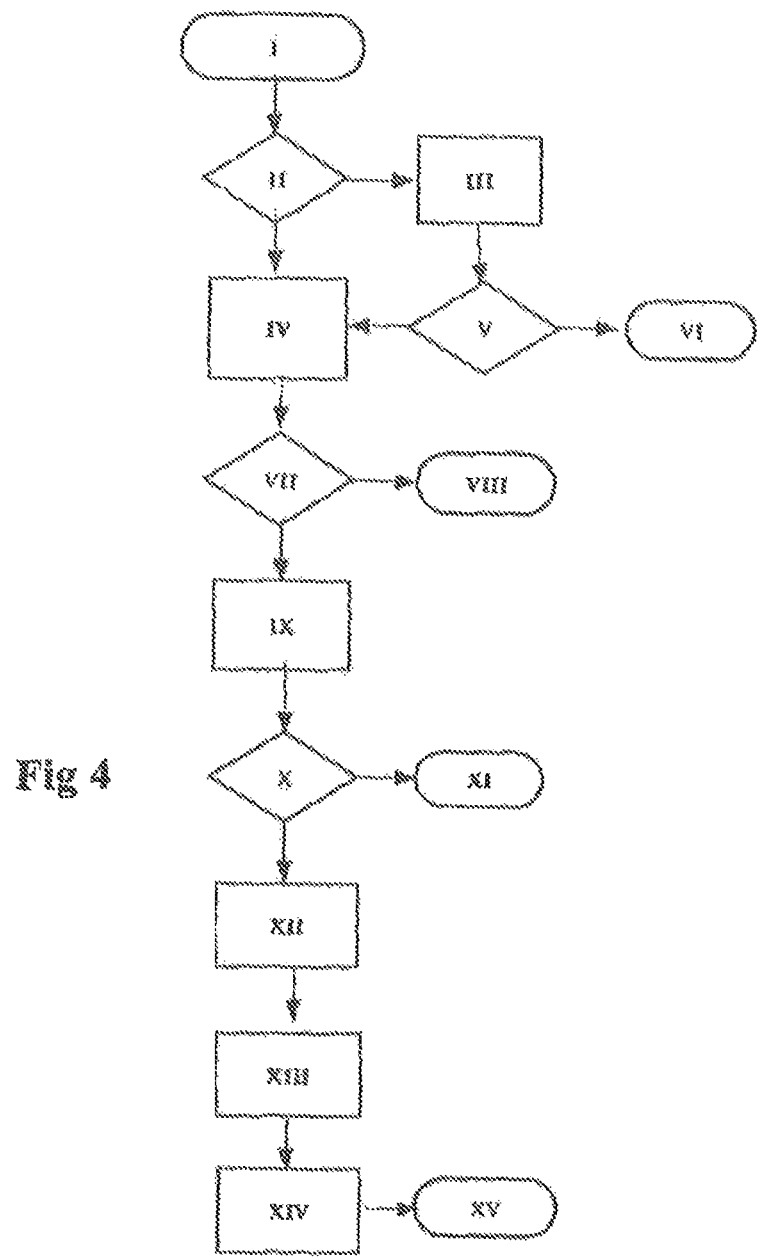

ID AUTHENTICATION

CROSS REFERENCE TO RELATED APPLICATIONS

This application is the U.S. National Stage entry of International Application Number PCT/GB2012/000774 filed under the Patent Cooperation Treaty having a filing date of Oct. 11, 2012, which claims priority to GB Patent Application Number 1117637.7 having a filing date of Oct. 12, 2011.

This invention relates to ID authentication.

The usual method for ID authentication is by a PIN, a four or more digit number entered, for example, on a keyboard of a computer or a keyboard or keypad of a mobile phone in order to access all or at least some of the functions of such equipment, or entered on a keypad of a credit or debit card payment terminal in a store, to verify that the card presenter is the card owner, it being assumed that only the card owner would know the PIN. For credit and debit cards, the PIN is mailed to the card presenter shortly after the card is mailed. The PIN is machine-generated and not known to the issuing bank or credit card company.

However, PINs can be compromised, often by careless usage, but also by, for example, covert surveillance at automatic tellers or keystroke monitoring software infiltrated on to a computer.

In some online credit and debit card transactions, a PIN, even though associated with a card, is not used. Instead, a security number printed on the reverse of the card, is used for verification purposes. If the card has been stolen, clearly the security number is available to the thief, and this measure provides no protection at all. It protects only against the use of card receipts on which the embossed card details are printed, but not, of course, the security number on the reverse. And it does not, even then, protect very well, as only the last three digits are requested, and, unlike PIN number guessing, which is a three strikes and out affair, there is no limit to the number of guesses allowed for the three digit security number. In such transactions, the fraud may not be detected until the monthly account is received, and even then may pass unnoticed. Sometimes out-of-character transactions are spotted by the credit card company, but the practice is prevalent and costly.

Banks and credit card companies are now using one-time password generating devices to verify on-line transactions. After log-in, using a PIN or password, the user derives a security number from such a device and inputs it in response to a screen request. The numbers generated by the device appear random, but in fact are algorithm-derived numbers that are checked by the company to see if they have or have not been generated by the algorithm. Presumably, also, as each number is used, it is stored and a number used twice is rejected.

These devices are not difficult to use in the context of a desktop computer for online transactions, but quite difficult with a mobile phone or other mobile hand-held communication equipment, when the user, who may be walking about, needs to hold the phone in one hand, the device in the other and somehow press an unfamiliar series of buttons. They are, in any event, application-specific, usable, for example, only with a specified bank account or credit card.

A system is known from GB2476989 in which a mobile computing device (equivalent to "equipment" as used herein) such as a mobile telephone is brought into proximity with an authentication tag (equivalent to "device" as used herein) comprising a passive RFID tag within the dimensions of a credit card. The device causes the tag to transmit authentication data that is validated by the device in order to launch a secure application such as a payment. Instead of a tag ID, the system can use one-time password creation, there being a counter on the card and on the device. Each time the authentication card is used, a new password is created using a cryptographic key, the new password acting as a new tag ID. This is a very convenient system, as it avoids having to remember a PIN, and it avoids the need to key in a PIN, which makes it suitable for 'on the go' transactions.

It has a flaw, however, inasmuch as the password on an authentication tag can be read by another computing device and matched for a validation procedure. If the tag is comprised in a payment card, a series of fraudulent transactions can take place before some other countermeasure can be applied.

The present invention provides methods and equipment for ID authentication that have the same advantages as the system known from GB2476989 and can be used in various contexts, and that better safeguard against PIN compromise.

The invention comprises a method for ID authentication using communication equipment that requires entry of a password to authorise its use for carrying out a transaction, in which the password is supplied by a limited-range communicating device separate from the communication equipment, the password being a one time password generated by the communication equipment and transmitted to the device and stored thereon in a password memory overwritten by a new password at each transaction for use at the next succeeding transaction, characterised in that the equipment generates the password using an algorithm unique to the equipment operating on a seed changed at each transaction, and in that the equipment checks a password supplied to it by the device by applying the reverse algorithm to generate the seed used to create it.

The seed may be a serial number incremented at each transaction, or a date or time-derived number or some other number having a recognisable format.

The password is not known to the user of the equipment, and cannot therefore be compromised in the usual ways.

The equipment may comprise a mobile phone or other mobile device operating in a cellular network, or a computer communicating over the Internet.

The physical separation means that both the equipment—mobile phone or computer—and the device would need to be compromised for unauthorised access to be possible. The mobile phone by itself would not allow ID authentication, which needs also the device. The device can be kept in a separate pocket or wallet, or might even be incorporated into an artefact that is somehow attached to the person, as a bracelet, necklace, ear-ring or wristwatch, making accidental loss of both components unlikely and theft much more difficult. It could even be implanted, after the fashion of pet ID microchips.

Equipment and device may be mutually dependent—the equipment may need a password from the device to operate at all, or at least to perform certain specified functions. And it may be arranged that the device cannot be operated, in whole or in part, except in conjunction with the equipment.

The device may comprise, or be comprised in, a credit card, a debit card, charge card, store card, pre-payment card, stored-value card or other transaction card.

The device may comprise a Radio Spectrum RFID (e.g. RFID or Bluetooth) device having at least one register that can be written to by the equipment. The device may carry an ID code and a password, which may be in the same or different registers. The ID code and password will be read by the equipment in an interrogation procedure. When the password has been verified, a new password will be overwritten.

A Radio Spectrum device may be passive, powered by induction from the equipment. The reading range may be small, as the device may be approximated to the equipment. It may be desired in any event to keep the transmission range small, in order to thwart eavesdroppers, but it may be convenient to have a range of one or two meters so that wherever the device is kept about the person it will be within range of the equipment.

A Radio Spectrum device may, however, be active, having its own power source, where greater range is appropriate.

Another level of security may be added by the usual PIN, known only to the user of the equipment or device. This PIN may be required to open the equipment for use. This guards against the chance that the equipment and the device are lost or stolen together. Further optional levels of security may be added using biometrics such as an iris scan using e.g. a mobile phone camera, or a fingerprint scan, or voice recognition using, again, functions on a mobile phone.

The invention also comprises apparatus for carrying out a secure transaction using communication equipment that requires entry of a password to authorise its use for carrying out transactions, comprising:

a limited-range communicating device separate from the communication equipment, having a memory for storing a password;

one-time password generating means in the communication equipment and transmitter means for transmitting a password generated thereby to the device to be stored in said memory;

stored password retrieving means in the communication equipment operative during a transaction to retrieve the stored password to validate the transaction;

retrieved password validating means in the communication equipment;

the password generating means being operative to generate a new password when a transaction has been validated and transmit it to the device to overwrite the password stored therein;

characterised in that the password generating means uses an algorithm unique to the equipment operating on a serial number incremented at each transaction, and in that the password validating means checks a retrieved password by applying the reverse algorithm to generate the serial number used to create it, authorising the transaction if it does, and declining to authorise the transaction if it does not.

Method and equipment for ID authentication according to the invention will now be described with reference to the accompanying drawings, in which:

FIG. 4 is a flowchart showing a procedure for ID authentication.

Figure 1:
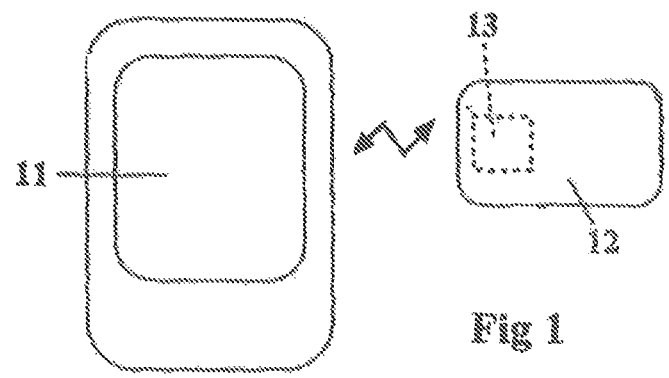
FIG. 1 is a diagrammatic representation of the method and equipment.
Figure 2:
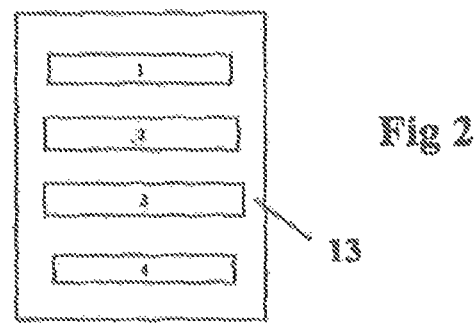
FIG. 2 is a diagrammatic representation of a Radio Spectrum device.
Figure 3:
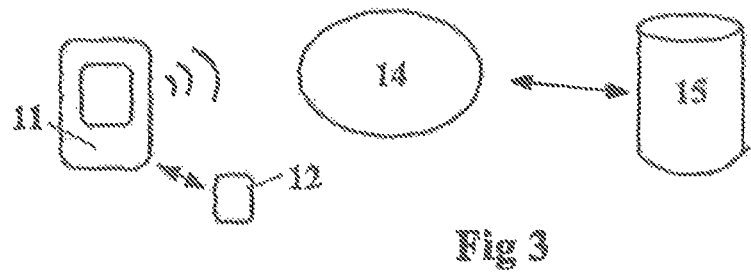
FIG. 3 is a diagrammatic illustration of the equipment in thee environment.

The drawings illustrate a method for ID authentication, in which equipment 11 involved in a transaction requests a password from a physically separate but limited-range communicating device 12, which automatically supplies a password in response to such request and communicates it to the equipment 11, the password is assessed as valid or invalid and the transaction approved or not accordingly.

The equipment 11 comprises a mobile phone or other mobile device operating in an environment 14 such as a cellular network, or a computer communicating over the Internet, with a server 15, which requires ID authentication. This might be a credit or debit card transaction system, or an online banking portal, or any other entity in which information is stored.

The physical separation means that both the equipment—mobile phone or computer 11—and the device 12 would need to be compromised for unauthorised access to be possible. A mobile phone by itself would not allow ID authentication, which needs also the device 12. The device 12, for use with a mobile phone or other mobile equipment, can be kept in a separate pocket or wallet, or might even be incorporated into an artefact that is somehow attached to the person, such as a bracelet, necklace, ear-ring or wristwatch, making accidental loss of both components unlikely and theft much more difficult. It could even be in a body piercing or be implanted, after the fashion of pet ID microchips.

Equipment 11 and device 12 may be mutually dependent—the equipment 11 may need a password from the device 12 to operate at all, or at least to perform certain specified functions. And it may be arranged that the device 11 cannot be operated, in whole or in part, except in conjunction with the equipment 11.

The device 12 may comprise, or be comprised in, a credit, a debit card, charge card, store card, pre-payment card, stored-value card or other transaction card. This will facilitate payment for goods or services using the combination of equipment and device. The card may be issued by a card company such as American Express, Access or Visa, or it may be provided, as, indeed, may any other manifestation of the device, by the company providing the equipment. Software for use in the arrangement may be provided already built in to the device or as an application or other downloadable module.

The password is a one-time password. The device 12 comprises a one-time password generator, generating passwords recognised by the equipment.

The device as illustrated comprises a Radio Spectrum device 13 having at least one register, as illustrated, four registers. 1-4, at least one of which can be written to by the equipment 11. The device 13, for example, carries an ID code in one of the registers and a password, in the same register or a different register. The ID code and password will be read by the equipment in an interrogation procedure. When the password has been verified, the equipment 11 will generate a new password that will be transmitted to the device 13 to overwrite the password just read. Passwords are produced by an algorithm from serial numbers or from a date or time value, or some other number having a recognisable format.

Thus, the equipment can generate a password which might for example be a number calculated from a serial number, starting, say, at 111111, by an algorithm that calculates, say, three further digits, which might be 125. In an initialising operation, this password—1111235—will be read to a register on the chip 13. The password does not need to be stored in the equipment 11. When a transaction needs to be authenticated, the equipment 11 reads the data in the registers on the chip 13. If the ID data is correct, it reads the password. It then applies a reverse algorithm to the password and if this generates the serial number 11111, it is accepted and the transaction authorised. The equipment 11 then generates, using the same algorithm, a new password from the next unused serial number 11112, which might be 11112479, and overwrites this as the new password on the chip.

The Radio Spectrum device 13 may be passive, powered by induction from the equipment. The reading range will be small, but the device 12 may be approximated as close as necessary to the equipment 11. It will be desired in any event to keep the transmission range small, in order to thwart eavesdroppers, but it may be convenient to have a range of one or two meters so that wherever the device is kept about the person it will be within range of the equipment.

A Radio Spectrum device may, however, be active, having its own power source, where greater range is appropriate.

FIG. 4 is a flowchart for an ID authenticating operation.

At step I the equipment 11 receives an authentication request and initiates the procedure by searching for the device 12 as step II. If the device is not in range, a "DEVICE NOT PRESENT" message is displayed, step III until a decision is taken at step V that the program has time out or a device is presented. If the program times out, a "DEVICE NOT PRESENTED" message is displayed and the operation terminated at step VI. If a device 12 is detected, the equipment reads its ID at step IV. It checks the ID at step VII. If the ID is incorrect, it causes "INCORRECT CARD" to be displayed and terminates the transaction at step VIII. If the ID corresponds to the ID stored in the equipment, it moves to step IX, where it reads the device password and operates on it with an algorithm that is the inverse of the algorithm that produced the password.

This should produce an integer serial number nnnn, from which the password was computed, which number is stored in the equipment, and this is checked at step X. If it does not, the password is incorrect, and the equipment causes "INCORRECT PASSWORD" to be displayed and terminates the transaction at step XI. It may also take other action, such as transmitting an advisory message. If it does produce the correct serial number, the password is correct, and the equipment moves on to step XII in which it generates a new password by adding 1 to the serial number to make a new seed (nnnn+1), storing that new seed for use in the next transaction, and applies the password-generating algorithm to it to generate a new password, overwriting, at step XIII the password on the device with this new password. It then takes at step XIV whatever action is required on authentication of the device ID and terminates the authentication procedure at XV.

The equipment and device must, of course, first be 'married'. If the equipment provider also provides the device, the ID of the device will already be stored in the memory of the equipment. This will, generally speaking, be on the SIM card of a mobile device such as a phone. The device will also have the algorithms for creating passwords from serial numbers and for testing passwords. The device will be supplied loaded with the first password.

If the device is provided by a bank, for example, and the device is a card for use on a customer account, the device ID can be sent to the equipment as a downloadable application loading the Device ID and the algorithms as well as software running the authentication procedure. The device ID can be transferred to the SIM card and deleted from the equipment's internal memory, so that it can be transferred to another mobile device, leaving no trace on the equipment.

It is, of course, necessary to provide means by which the equipment 11 reads the device 12. A mobile phone equipped with near field communication is ideal. Card readers are available for desktop and laptop computers.

While Radio Spectrum devices are generally referred above, and RFID and Bluetooth given as instances, it will be understood that any short range or near field communication technology may be used.

Another level of security may be added by the usual PIN, known only to the user of the equipment 11 or device 13. This PIN may be, required to open the equipment 11 for use, for example, in the normal way, or to cause it to enter 'transaction mode', which may involve switching on a Radio Spectrum transmitter/receiver or energising an induction transmitter for communicating with the device. This guards against the chance that the equipment and the device are lost or stolen together.

Further optional levels of security may be added using biometrics such as iris scan using e.g. a mobile phone camera, or a fingerprint scan, or voice recognition.

The invention claimed is:

1. A method for ID authentication using communication equipment that requires entry of a password to authorise its use for carrying out a current transaction, in which the password is supplied by a limited-range communicating device separate from the communication equipment, the password being a one-time password generated by the communication equipment and transmitted to the device and stored thereon in a password memory during a previous transaction therewith, whereby the equipment generates the password using an algorithm unique to the equipment operating on a seed number incremented at each transaction, and in that, for the current transaction, the equipment checks the password supplied to it by the device by applying a reverse algorithm to generate the seed number used to create it, and wherein the password stored in the password memory on the device is overwritten by a new password generated by the equipment for use at the next succeeding transaction with the device.

2. A method according to claim 1, in which the equipment comprises a mobile phone or other mobile device operating in a cellular network, or a computer communicating over the Internet.

3. A method according to claim 1, in which the device can be kept in a separate pocket or wallet, or is incorporated into an artefact that is somehow attached to the person, as a bracelet, necklace, ear-ring or wristwatch.

4. A method according to claim 1, in which the device comprises, or is comprised in, a credit, a debit card, charge card, store card, pre-payment card, stored-value card or other transaction card.

5. A method according to claim 1, in which the device comprises a Radio Spectrum device having at least one register that can be written to by the equipment.

6. A method according to claim 5, in which the Radio Spectrum device is passive, powered by induction from the equipment.

7. A method according to claim 5, in which the Radio Spectrum device is active, having its own power source.

8. A method according to claim 1, in which the device comprises a Bluetooth or other short range wireless device.

9. A method according to claim 1, in which the device comprises an RFID device.

10. A method according to claim 1, in which there is an additional level of protection.

11. A method according to claim 10, in which that additional level of protection involves a known-to-the-user PIN.

12. A method according to claim 10, in which that additional level of protection involves a biometric.

13. Apparatus for carrying out a secure transaction using communication equipment that requires entry of a password to authorise its use for carrying out transactions, comprising:
- a limited-range communicating device separate from the communication equipment, having a memory for storing a password;
- one-time password generating means in the communication equipment and transmitter means for transmitting a password generated thereby to the device to be stored in said memory;
- stored password retrieving means in the communication equipment operative during a transaction to retrieve the stored password to validate the transaction;
- retrieved password validating means in the communication equipment;
- in which the password generating means uses an algorithm unique to the equipment operating on a seed number incremented at each transaction, and in that the password validating means checks a retrieved password by applying a reverse algorithm to generate the seed number used to create it, authorising the transaction if it does, and declining to authorise the transaction if it does not; and
- the password generating means being operative to generate a new password when a current transaction has been validated and transmit it to the device to overwrite the password stored therein for use at a next succeeding transaction with the device.

14. Apparatus according to claim 13, in which the equipment comprises a mobile phone or other mobile device operating in a cellular network, or a computer communicating over the Internet.

15. Apparatus according to claim 13, in which the device comprises, or is comprised in, a credit, a debit card, charge card, store card, pre-payment card, stored-value card or other transaction card.

16. Apparatus according to claim 13, in which the device comprises a Radio Spectrum device having at least one register that can be written to by the equipment.

17. Apparatus according to claim 13, in which the device carries an ID code in addition to the password, which may be in the same or different registers.

* * * * *